US008825821B2

(12) United States Patent
Bohm (10) Patent No.: US 8,825,821 B2
(45) Date of Patent: Sep. 2, 2014

(54) METHOD AND SYSTEM FOR SELECTION OF A RUNTIME STACK FOR DEPLOYMENT OF A WEB SERVICE

(75) Inventor: Fraser Paul Bohm, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 12/692,984

(22) Filed: Jan. 25, 2010

(65) Prior Publication Data

US 2010/0191843 A1     Jul. 29, 2010

(30) Foreign Application Priority Data

Jan. 26, 2009 (GB) ................................ 09151359.8

(51) Int. Cl.
*G06F 15/173*     (2006.01)
*G06F 15/16*     (2006.01)

(52) U.S. Cl.
USPC .......................................... 709/223; 709/203

(58) Field of Classification Search
CPC .... H04L 67/02; G06F 17/3089; G06Q 10/10; G06Q 30/00
See application file for complete search history.

(56) References Cited

U.S. PATENT DOCUMENTS

2007/0067421 A1    3/2007   Angelov
2007/0156872 A1    7/2007   Stoyanova

FOREIGN PATENT DOCUMENTS

WO     2007036220 A3     4/2007

OTHER PUBLICATIONS

Understanding Web Services Policy, Jul. 6, 2006, Version 1.0, Authors Asir S Vedamuthu, Daniel Roth, Microsoft Corporation, pp. 2, 4-6, 10, 13-18, 25 and 28-29.*
Aaron Skonnard; "Understanding WS-Policy"; Internet Citation Aug. 2003; pp. 1-8, xp002355708; Retrieved from the Internet: URL:http://msdn.microsoft.com/library/en-us/dnwebsrv/html/understwspol.asp?frame=true>.
Adam Lieber, "JavaZone: a View of Apache Geronimo", 2006, 17 pages, IBM Corporation.
Tang, Q. C., Cheng, H. K., "Optimal location and pricing of web services intermediary", Decision Support Systems, p. 129-141, 2005, vol. 40 no. 1, Gainesville, FL, USA.
B. Thale, "Dynamic Discovery of Web Service Registries", IPCOM000032892D (Motorola disclosure), Nov. 17, 2004, 7 pages, IP.Com.

* cited by examiner

*Primary Examiner* — Peling Shaw
(74) *Attorney, Agent, or Firm* — Jordan IP Law, LLC (57) ABSTRACT

A method and system for selection of a runtime stack for deployment of a Web Service are provided. The method includes: generating policy assertions for a Web Service to be deployed; providing a scoring mechanism for each available runtime stack in which the ability of a stack to support each of a plurality of policy assertions is scored; applying the scoring mechanism for each available runtime stack to the policy assertions for the Web Service (220) to be deployed; and selecting a stack based on the results of applying the scoring mechanism. The policy assertions for a Web Service to be deployed can include a combination of specification defined Web Service policy assertions, WSDL elements of the Web Service which are mapped to policy assertions, and side information requirements of the Web Service which are mapped to policy assertions.

21 Claims, 9 Drawing Sheets

METHOD AND SYSTEM FOR SELECTION OF A RUNTIME STACK FOR DEPLOYMENT OF A WEB SERVICE

FIELD OF THE INVENTION

This invention relates to the field of configuration of Web Services. In particular, the invention relates to selection of a runtime stack for deployment of a Web Service.

BACKGROUND

In situations where a runtime system (Web Services endpoint) has available multiple Web Services stacks, the deployer has to choose the target deployment stack. The stacks will have differing functional and non-functional capabilities.

The deployer needs to understand both the relative functional and non-functional capabilities of the Web Services stacks and the tradeoffs between them. Individual Web Services may exploit or require different subsets of these capabilities and therefore the optimal stack for deployment of one Web Service may not be the optimal stack for another, again the deployer must choose and configure the appropriate stack. This choice requires significant knowledge of the stacks' characteristics as well as of the individual Web Service's requirements and is thus a time consuming and error prone process.

WS-Policy (www.w3.org/Submission/WS-Policy/) provides a standard mechanism for a Web Services provider to describe these functional and non-functional requirements and capabilities. The WS-Policy includes the following paragraphs.

WS-Policy provides a flexible and extensible grammar for expressing the capabilities, requirements, and general characteristics of entities in an XML (eXtensible Markup Language) Web services-based system. WS-Policy defines a framework and a model for the expression of these properties as policies.

WS-Policy defines a policy to be a collection of policy alternatives, where each policy alternative is a collection of policy assertions. Some policy assertions specify traditional requirements and capabilities that will ultimately manifest on the wire (e.g., authentication scheme, transport protocol selection). Other policy assertions have no wire manifestation yet are critical to proper service selection and usage (e.g., privacy policy, QoS (quality of service) characteristics). WS-Policy provides a single policy grammar to allow both kinds of assertions to be reasoned about in a consistent manner."

Applied in the Web Services model, policy is used to convey conditions on an interaction between two Web Service endpoints. Satisfying assertions in the policy usually results in behavior that reflects these conditions. Typically, the provider of a Web service exposes a policy to convey conditions under which it provides the service. A requester might use this policy to decide whether or not to use the service. A requester may choose any alternative since each is a valid configuration for interaction with the service, but a requester MUST choose only a single alternative for an interaction with a service since each represents an alternative configuration.

A policy assertion is supported by a requester if and only if the requester satisfies the requirement (or accommodates the capability) corresponding to the assertion. A policy alternative is supported by a requester if and only if the requester supports all the assertions in the alternative. And, a policy is supported by a requester if and only if the requester supports at least one of the alternatives in the policy. Note that although policy alternatives are meant to be mutually exclusive, it cannot be decided in general whether or not more than one alternative can be supported at the same time."

In general WS-Policy is used by a provider to communicate these requirements to a requester and sometimes by a requester to validate that a given provider meets some level of required behavior.

SUMMARY

According to a first aspect of the present invention there is provided a method for selection of a runtime stack for deployment of a Web Service, comprising: generating policy assertions for a Web Service to be deployed; providing a scoring mechanism for each available runtime stack in which the ability of a stack to support each of a plurality of policy assertions is scored; applying the scoring mechanism for each available runtime stack to the policy assertions for the Web Service to be deployed; and selecting a stack based on the results of applying the scoring mechanism.

Generating policy assertions for a Web Service to be deployed may include one or more of: using specification defined Web Service policy assertions; scanning a service description in WSDL (Web Services Description Language) for WSDL elements of the Web Service and mapping the WSDL elements to policy assertions; and/or converting side information requirements of the Web Service and mapping the requirements to policy assertions.

The side information may be provided by a provider or a requester of the Web Service to be deployed and the side information may relate to service requirements of the provider or requester.

Generating policy assertions for a Web Service to be deployed may include normalizing a policy to include one or more alternative sets of policy assertions, and wherein applying the scoring mechanism may comprise applying the scoring mechanism to each set of policy assertions.

If the selection of runtime stack is for a Web Service provider, the results of the scoring mechanism may be used to select a stack which supports all the sets of policy assertions. If the selection of runtime stack is for a Web Service requester, the results of the scoring mechanism may be used to select a stack which best supports one of the alternative sets of policy assertions.

The scoring mechanism may give a positive value if a policy assertion is supported and a negative value if a policy assertion is not supported by a stack. The values may be combined for a set of policy assertions required for a Web Service.

A runtime stack may handle the Web Services protocol and transport processing required for a request or response.

According to a second aspect of the present invention there is provided a computer program product stored on a computer readable storage medium for selection of a runtime stack for deployment of a Web Service, comprising computer readable program code means for performing the steps of: generating policy assertions for a Web Service to be deployed; providing a scoring mechanism for each available runtime stack in which the ability of a stack to support each of a plurality of policy assertions is scored; applying the scoring mechanism for each available runtime stack to the policy assertions for the Web Service to be deployed; and selecting a stack based on the results of applying the scoring mechanism.

According to a third aspect of the present invention there is provided a method of providing a service to a customer over a network, the service comprising: generating policy assertions for a Web Service to be deployed; providing a scoring mechanism for scoring each available runtime stack on the ability of the stack to support each of a plurality of policy assertions; applying the scoring mechanism for each available runtime stack to the policy assertions for the Web Service to be deployed; and selecting a stack based on the results of applying the scoring mechanism.

According to a fourth aspect of the present invention there is provided a system for selection of a runtime stack for deployment of a Web Service, comprising: a runtime container including a processor and a plurality of stacks to which a Web Service could be deployed; a generator for generating policy assertions for a Web Service to be deployed; a scoring mechanism for scoring each available runtime stack on the ability of the stack to support each of a plurality of policy assertions; applying the scoring mechanism for each available runtime stack to the policy assertions for the Web Service to be deployed; and a selector for selecting a stack based on the results of applying the scoring mechanism.

The generator may include one or more of: listing specification defined Web Service policy assertions; a mechanism for scanning a service description in WSDL for WSDL elements of the Web Service and rules mapping the WSDL elements to policy assertions; and a converter of side information requirements of the Web Service and rules mapping the requirements to policy assertions. The generator may include a normalizer for normalizing a policy to include one or more alternative sets of policy assertions, and wherein applying the scoring mechanism comprises applying the scoring mechanism to each set of policy assertions.

If the runtime container is a provider of a Web Service, the results of the scoring mechanism may be used to select a stack which supports all the sets of policy assertions. If the runtime container is a requester of a Web Service, the results of the scoring mechanism may be used to select a stack which best supports one of the alternative sets of policy assertions.

A runtime system which contains multiple Web Services stacks can use a combination of WS-Policy information for a Web Service and a heuristic function for each stack to choose the optimal stack to deploy that Web Service to during deployment and to configure the instance of that stack appropriately.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described method and system enable a runtime system which contains multiple Web Services stacks to use a combination of WS-Policy information for a Web Service and a heuristic function for each stack to choose the optimal stack to deploy the Web Service to.

Web Services can implement a service-oriented architecture (SOA). Web Services make functional building blocks accessible over standard Internet protocols independent of platforms and programming languages. Each SOA building block can play one or both of two roles: as a service provider, or as a service requester.

Figure 1:
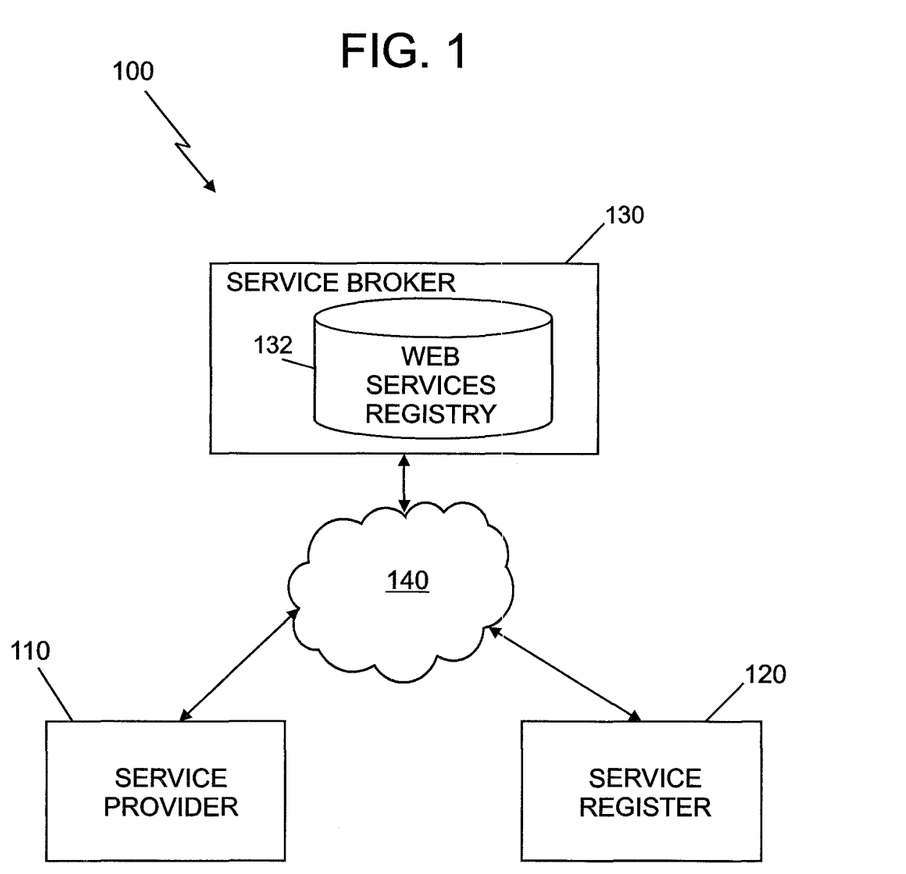
FIG. 1 is a block diagram of a Web Service architecture in which the present invention may be implemented.

FIG. 1 shows an exemplary Web Service architecture 100. The Web Service architecture 100 includes a service provider 110 and a service requester 120 which communicate over a network 140. A service broker 130 is provided with a Web Services registry 132.

The service provider 110 creates a Web Service and possibly publishes its interface and access information to the Web Services registry 132. Each provider must decide which services to expose, how to make trade-offs between security and easy availability, how to price the services, or, if they are free, how to exploit them for other value. The provider also has to decide what category the service should be listed in for a given broker service and what sort of trading partner agreements are required to use the service. It registers what services are available within it, and lists all the potential service recipients.

Public service brokers 130 are available through the Internet, while private service brokers are only accessible to a limited audience, for example, users of a company intranet. The Universal Description Discovery and Integration (UDDI) specification defines a way to publish and discover information about Web Services.

The service requester 120 or Web Service client locates entries in the Web Services registry 132 using various find operations and then binds to the service provider 110 in order to invoke one of its Web Services.

Figure 2A:
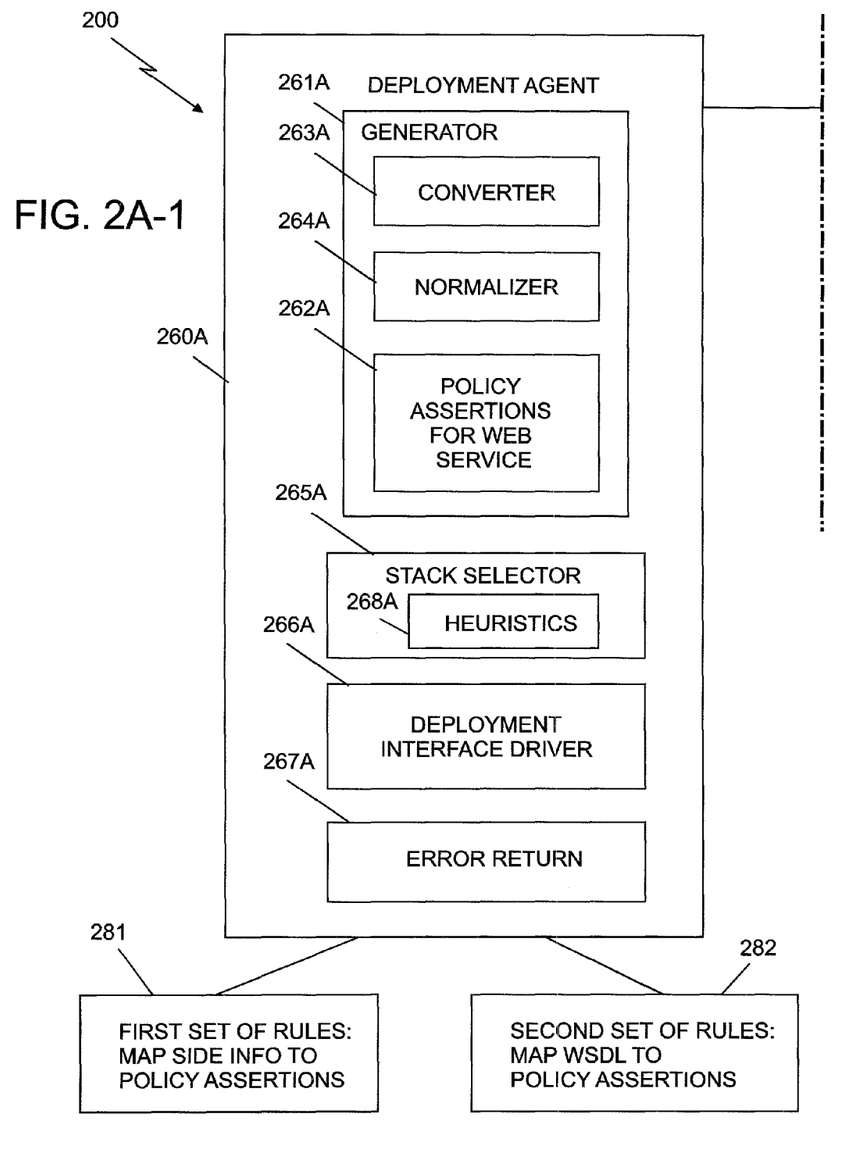
FIGS. 2A and 2B are block diagrams of Web Service architectures in accordance with aspects of the present invention.
Figure 2A:
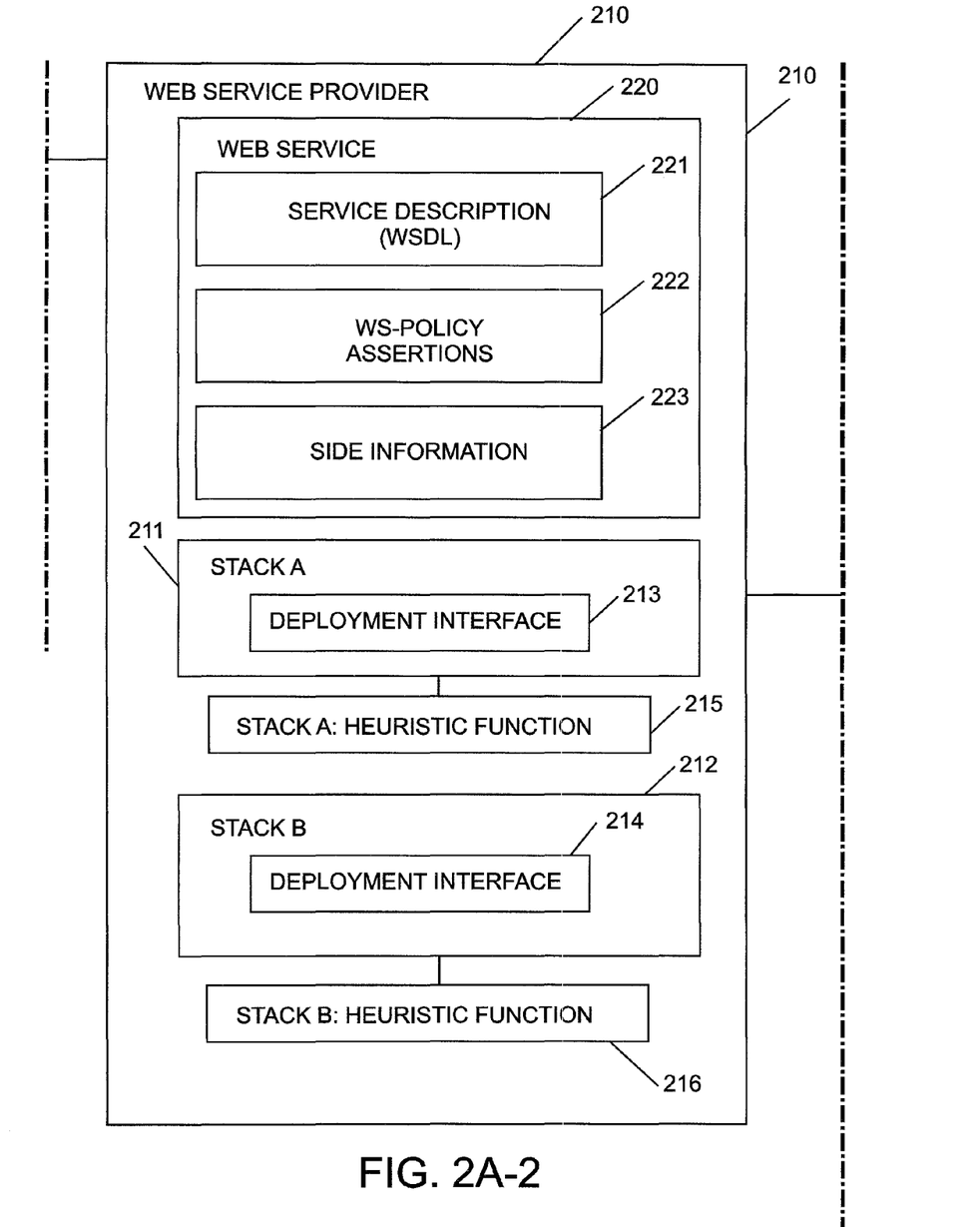
Figure 2A:
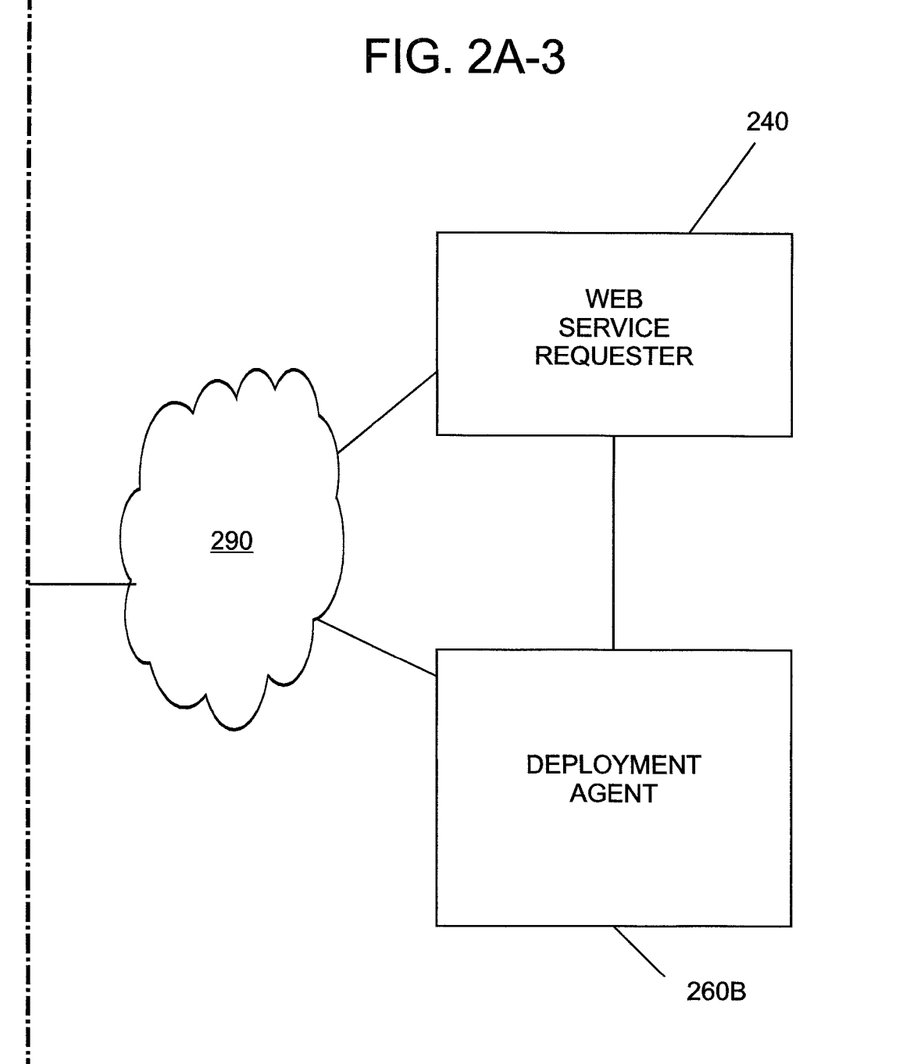
Figure 2A:
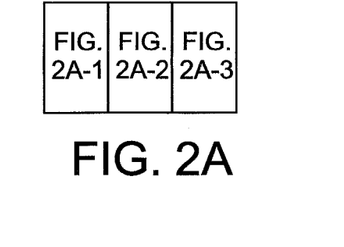
Figure 2B:
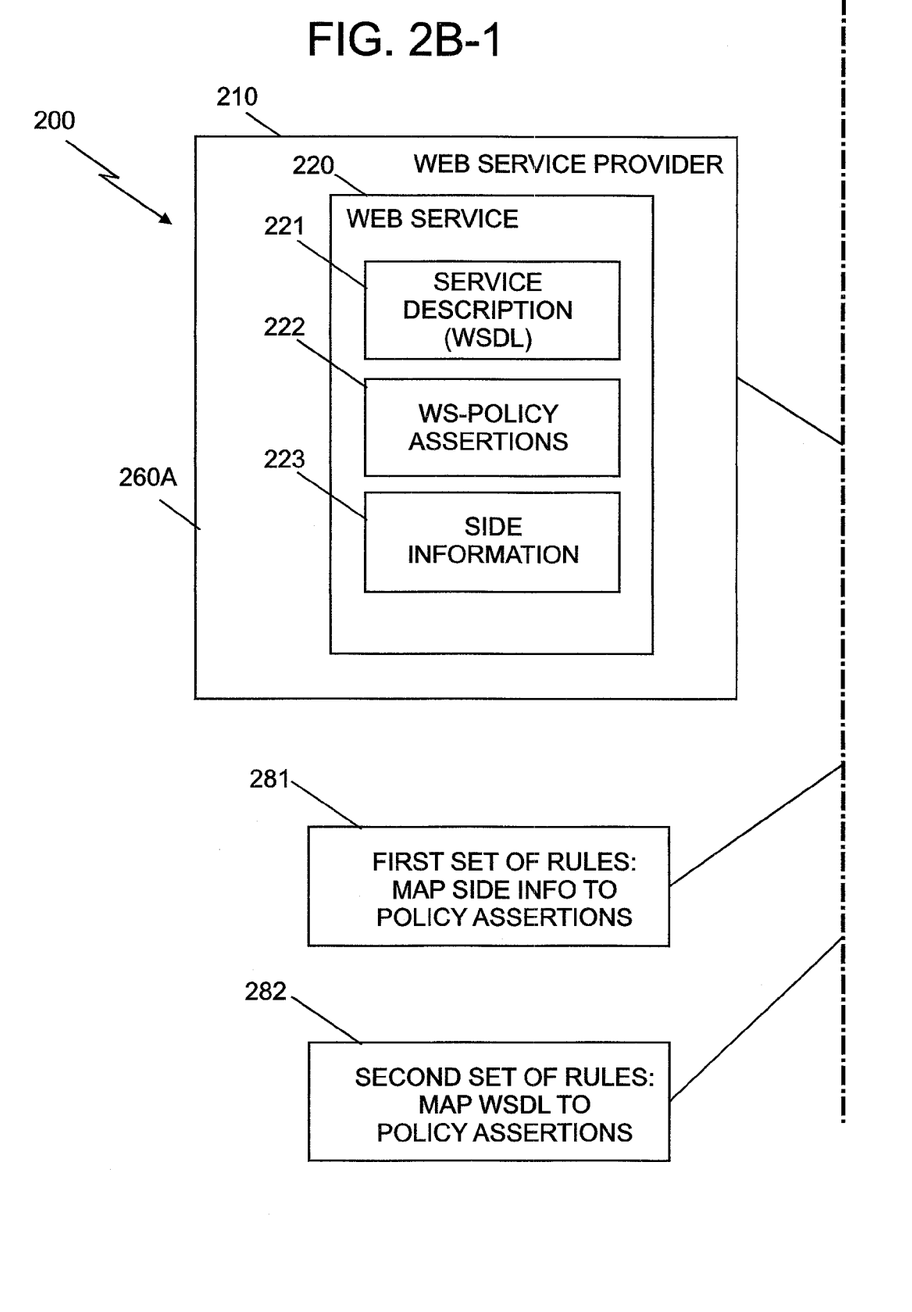
Figures 2B, 2B:
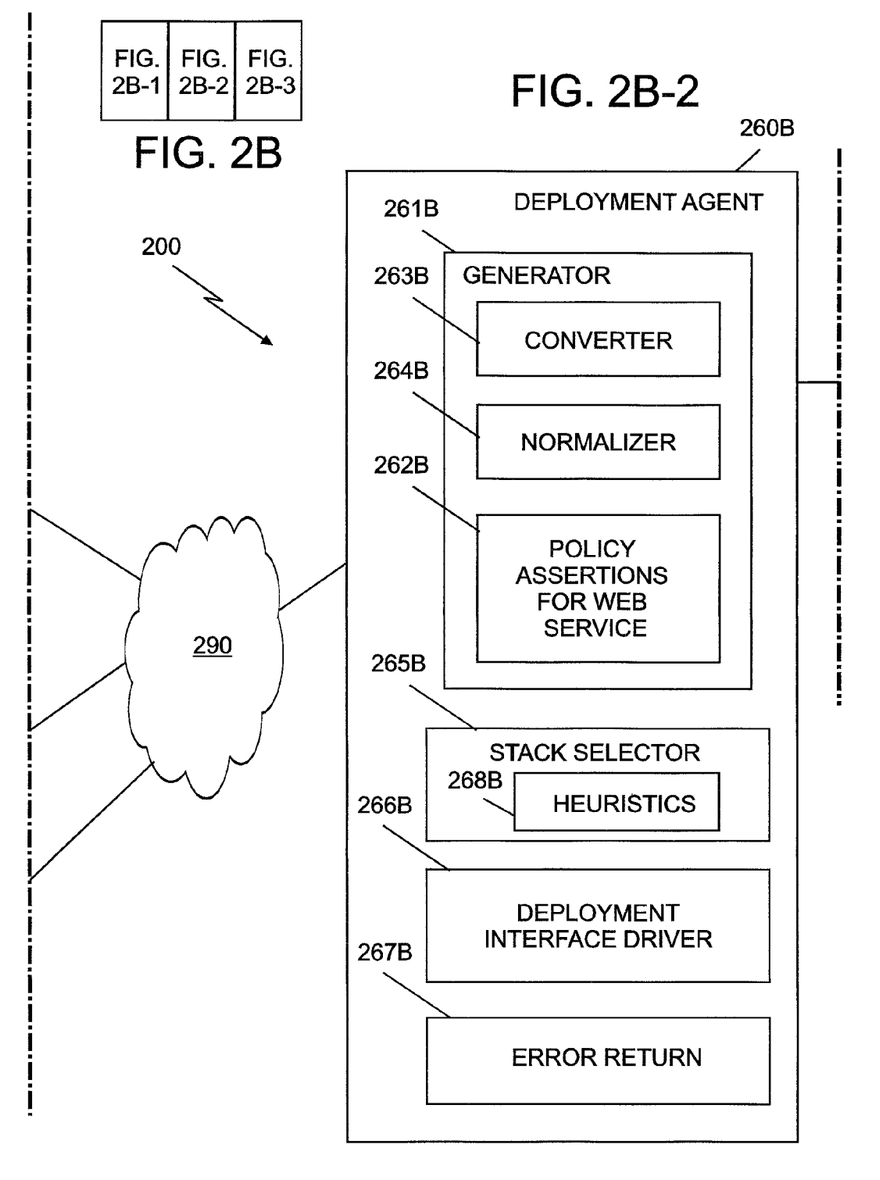

Referring to FIGS. 2A and 2B, a described Web Services system 200 is shown with a Web Service provider 210 providing a Web Service 220 to be deployed, and a Web Service requester 240.

FIG. 2A shows a Web Service provider 210 which hosts one or more Web Services stacks 211, 212 and a Web Service 220. A stack 211, 212 handles the Web Service's protocol/transport processing required for a given request/response on behalf of the Web Service 220.

The Web Service 220 which may be provided at the provider 210 or at a registry includes: a service description 221 in WSDL (Web Services Description Language); a set of WS-Policy assertions 222; and, optionally, side information 223 concerning non-policy implementation requirements, if needed. The side information 223 is only required if all the needs of the deployed Web Service 220 are not already expressed in the WS-Policy assertions 222 associated with the external view of the Web Service 220. The side information 223 would commonly include service level agreements (timeouts, throughputs etc) which are relevant to the provider 210.

A Web Service requester 240 is provided which may request a Web Service 220 from a provider 210 via a network 290. The Web Service requester 240 has a container which hosts one or more Web Services stacks which are shown in FIG. 2B.

Examples of Web Services stacks and containers which may be used by the provider and requester include: Apache Axis2 (Apache Axis2 is a trade mark of Apache Software Foundation of Forest Hill, Md.), .NET (.NET is a trade mark of Microsoft Corporation of Redmond, Wash.), BEA WebLogic (BEA WebLogic is a trade mark of Oracle Corporation of Redwood City, Calif.), GlassFish (GlassFish is a trade mark of Sun Microsystems, Inc. of Santa Clara, Calif.), WebSphere (WebSphere is a trade mark of International Business Machines Corporation of Armonk, N.Y.), CICS TS (CICS is a trade mark of International Business Machines Corporation), JBoss (JBoss is a trade mark of Red Hat Inc. of Raleigh, N.C.), etc. Many runtimes only support one stack in which case the terms container/stack are synonymous; however, some containers host multiple stacks.

In the described system, a deployment agent 260A, 260B is provided which is asked by a user to deploy the Web Service 220. A deployment agent 260A, 260B may be used by the provider 210 as shown in FIG. 2A or by the requester 240 as shown in FIG. 2B. The deployment agent may be provided as a runtime component of the container of the provider 210 or requester 240 or as a separate entity in direct communication with the requester or in communication via a network.

Referring to FIG. 2A, the deployment agent 260A includes a generator 261A of a set of policy assertions 262A for the Web Service 220 to be deployed. The set of policy assertions 262A is a combined list generated from the service description 221, the WS-Policy 222, and the side information 223 of the Web Service 220.

The generator 261A includes a converter 263A which uses a first set of rules 281 that maps the side information 223 to policy assertions 262A (possibly empty), and a second set of rules 282 that maps the WSDL elements of the service description 221 to policy assertions 262A (possibly empty). The sets of rules 281, 282 can be provided locally to a deployment agent 260A, a Web Service provider 210, or may be made available from another source via a network. The WS-Policy 222 for the Web Service 220 has specified policy assertions which can be added directly to the set of policy assertions 262A.

The generator 261A also includes a policy normalizer 264A which normalizes the policies to a required form of the set of policy assertions 262A. This results in a set of policy assertions 262A which is of the form of a list of possible policy sets, e.g., including policy option 1 or option 2 or option 3 etc. and each option is a conjunction of assertions e.g., assertion 1 & assertion 2 & assertion 3.

The one or more Web Services stacks 211, 212 each have a deployment interface 213, 214 which is understood by the deployment agent 260A. Each of the Web Services stacks 211, 212 in the container has a heuristic function 215, 216 or scoring mechanism which scores the stack's suitability for policy assertions.

The deployment agent 260A includes a stack selector 265A which applies the heuristic functions 268A of the available stacks 211, 212 to the set of policy assertions 262A for the Web Service 220 to be deployed.

The deployment agent 260A also includes a deployment interface driver 266A for driving a selected stack's deployment interface 213, 214 and an error return 267A if no stack is selected.

Referring to FIG. 2B, a Web Service requester 240 is shown in more detail which hosts one or more Web Services stacks 241-243 on which a Web Service 220 from a provider 210 may be deployed. The requester 240 also hosts an application 244 for executing the Web Service 220. The application 244 may include side information 245 defining internal policy of the application. A stack 241-243 handles the Web Service's protocol/transport processing required for a given request/response on behalf of another component in the container 240 such as the application 244.

The deployment agent 260B of the requester 240 is similar to that of the provider 210 described in FIG. 2A. The deployment agent 260B includes a generator 261B of a set of policy assertions 262B for the Web Service 220 to be deployed. The set of policy assertions 262B is a combined list generated from the service description 221, the WS-Policy 222, and the side information 223 of the Web Service 220. In addition, the generator 261B may use the side information 245 of the requester 210 in the policy assertions 262B.

The generator 261B includes a converter 263B which uses a first set of rules 281 that maps the side information 223, 245 to policy assertions 262A (possibly empty), and a second set of rules 282 that maps the WSDL elements of the service description 221 to policy assertions 262B (possibly empty). The sets of rules 281, 282 can be provided locally to a deployment agent, a Web Service requester, or may be made available from another source via a network. The WS-Policy 222 for the Web Service 220 has specified policy assertions which can be added directly to the set of policy assertions 262B.

The generator 261B also includes a policy normalizer 264B which normalizes the policies to a required form of the set of policy assertions 262B.

The one or more Web Services stacks 241-243 each has a deployment interface 251-253 which is understood by the deployment agent 260B. Each of the Web Services stacks 241-243 in the container 240 has a heuristic function 271-273 which scores the stack's suitability for policy assertions.

The deployment agent 260B includes a stack selector 265B which applies the heuristic functions 268B of the available stacks 241-243 of the requester 240 to the set of policy assertions 262B for the Web Service 220 to be deployed.

The deployment agent 260B also includes a deployment interface driver 266B for driving a selected stack's deployment interface 251-253 and an error return 267B if no stack is selected.

When a Web Service 220 is deployed to a provider 210, the provider's deployment agent 260A chooses a stack 211, 212 in the provider container. Sometime later, when a requester 240 wants to interact with the Web Service 220, a service consumer is deployed into the requester container and the requester deployment agent 260B selects which of the requester container's stacks 241-243 to use. If another distinct requester also wants to use the Web Service 220, then the same process is repeated. Not all requesters and providers need use the described deployment agent to select the stack, as it is an internal process to each container.

Figure 3:
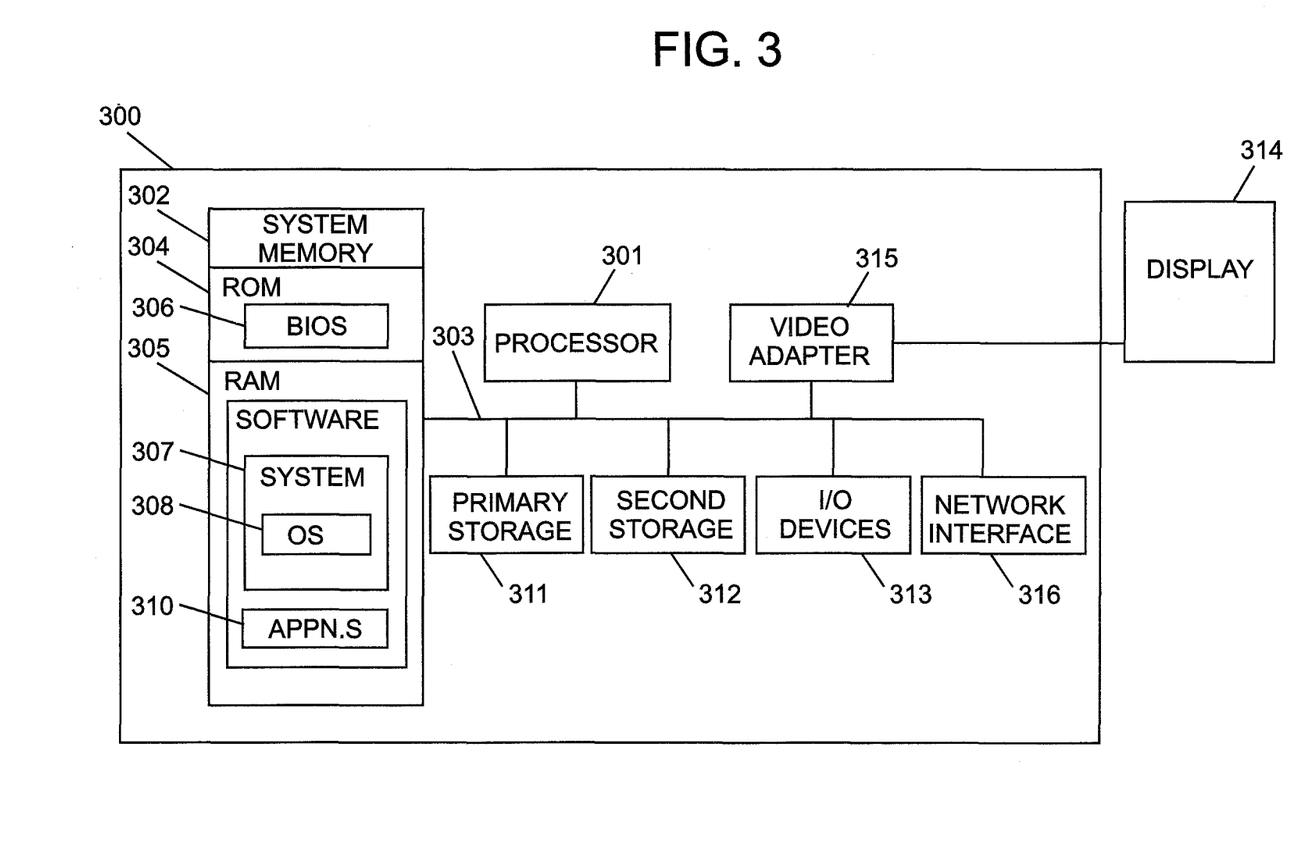
FIG. 3 is a block diagram of a computer system in which the present invention may be implemented.

Referring to FIG. 3, an exemplary system for implementing the deployment agent, a Web Service provider, or a Web Service requester includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
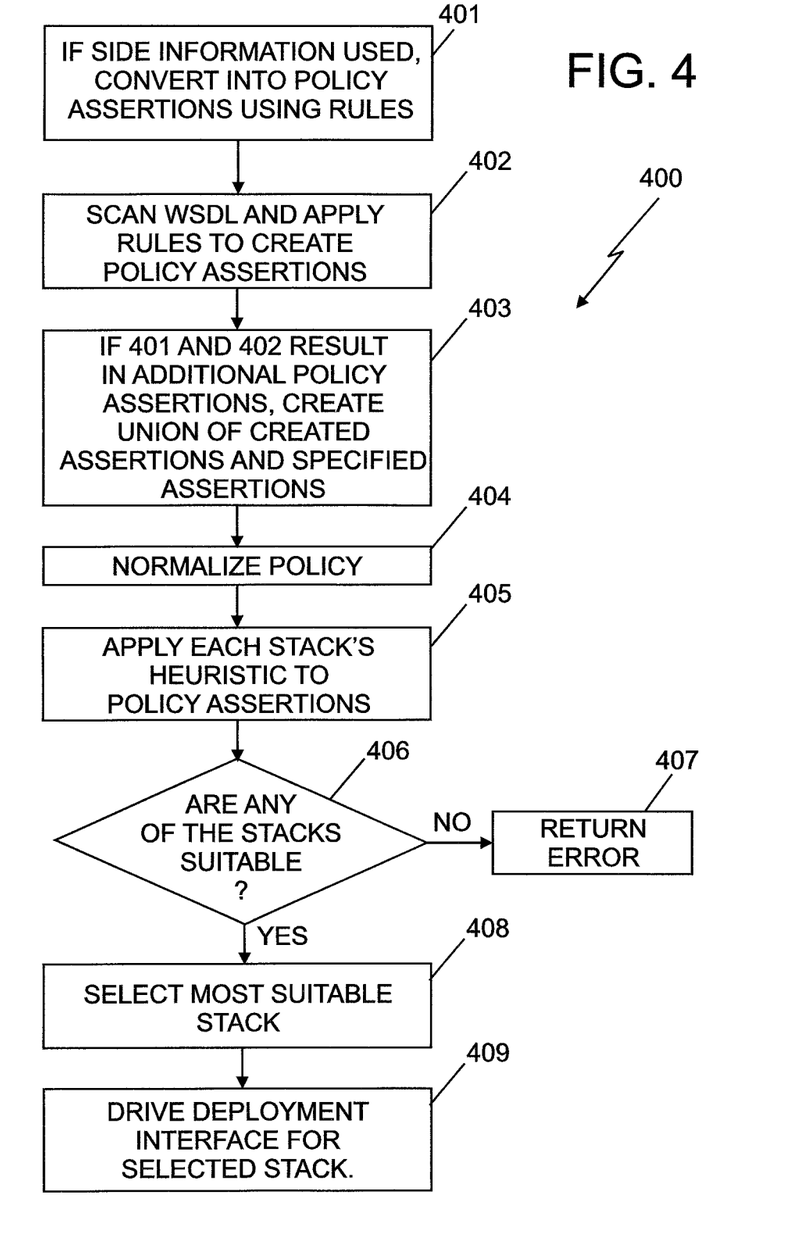
FIG. 4 is a flow diagram of a method carried out at deployment of a Web Service in accordance with the present invention.

Referring to FIG. 4, a flow diagram 400 of a method carried out by a described deployment agent is shown.

If side information is used, convert the side information into a set of WS-policy assertions using rules (STEP 401). Scan the WSDL and apply rules to create another set of policy assertions (STEP 402). If steps 401 or 402 resulted in any additional assertions, create an effective policy as the union of the created assertions and the specified ones (STEP 403).

The policy as defined in the WS-Policy specification is normalized (STEP 404) to result in a policy which is of the form of a list of possible policy sets. So, for example, the policy comprises option 1, or option 2, or option 3, etc., and each option is a conjunction of assertions e.g., assertion 1 & assertion 2 & assertion 3. Each stack's heuristic is then applied to the resulting set of policy assertions (STEP 405).

It is determined whether or not any of the stacks are suitable (STEP 406). If not (i.e., none of the stacks are suitable), an error is returned (STEP 407). If there are suitable stacks (YES in decision block 406), then the most suitable stack is selected (STEP 408) and the deployment interface for that stack is driven (STEP 409) passing the information from the normalized policy.

A provider's stacks must support all choices of policy sets in a policy. However, a requester could choose a policy set and therefore does not need the selected stack to support all policy sets.

Assertions

The policy assertions that may be defined are open ended, in that WS-Policy defines a framework and individual other specifications define assertions for their specific use. The following are some examples but not a definitive list.

Some assertions are straightforward and are listed below with exerts from the relevant specifications. These specifications simply define a single assertion each: the assertion saying that the capability defined in that specification must be used. They can have the optional attribute that says may be used, rather than must. More complex assertions include WS-SecurityPolicy assertions.

WS-RM (Web Service policy assertion for Reliable Messaging)

The normative outline for the RM assertion is:

```
<wsrmp:RMAssertion [wsp:Optional="true"]? ... >
...
</wsrmp:RMAssertion>
```

The following describes additional, normative constraints on the outline listed above:
/wsrmp:RMAssertion
A policy assertion that specifies that WS-ReliableMessaging protocol MUST be used when sending messages.
WS-AT (Web Service policy assertion for Atomic Processing)
The normative outline for the Atomic Transaction policy assertion is:

```
<wsat:ATAssertion [wsp:Optional="true"]? ... >
...
</wsat:ATAssertion>
```

The following describes additional, normative constraints on the outline listed above:
/wsat:ATAssertion
A policy assertion that specifies that an Atomic Transaction coordination context MUST be flowed inside a requester's message. From the perspective of the requester, the target service that processes the transaction MUST behave as if it had participated in the transaction. For application messages that use a SOAP binding, the Atomic Transaction coordination context MUST flow as a SOAP header in the message.
MTOM/XOP (Web Services policy assertion for SOAP Message Transmission Optimization Mechanism/XML-binary Optimized Packaging)
The normative pseudo schema for the MTOM policy assertion is:
<wsoma:MTOM wsp:Optional? . . . />
The following describes additional constraints on the pseudo schema listed above:
/wsoma:MTOM
A policy assertion that specifies that MTOM MUST be used in messages sent to the Web Service. It also specifies that responses from the Web Service MUST be optimized using MTOM, i.e. that the messages must be sent using the multipart/related;
type=application/xop+xml mime type.
Heuristic Functions The heuristic functions or scoring mechanisms of the stacks may be created in a number of different ways.

In one embodiment, the heuristic function for a given stack returns a positive value if the stack supports the input assertions set and a negative value/exception if not. A well designed heuristic function will give higher positive values to 'better' stacks for that set of assertions. This simple function assumes the assertions are distinct.

In another embodiment, a more complex method would be to create a value correlated on subsets of policy assertions from the input set or to do further detailed analysis of individual assertion parameters.

A provider defines the services and its external policy. If the provider defines the Web Service as supporting multiple options (policy choices) for communicating with it, a requester can choose any of those options and expect it to work. Thus, when choosing a stack for the provider to deploy to, it has to support all the options as the requester could choose to use any of them. In terms of the heuristic, the provider should not choose any stack that returns a negative value/error for any policy set in the normalized policy.

A requester retrieves the policy and service definition from the provider or a registry. It may also have its own side information. The requester only has to support one way of talking to the provider so it can choose a stack that returns a negative value/error for a policy set in the normalized policy as long as at least one of the policy sets does not return a negative value/error.

To summarize, a provider must support all choices so must select a stack which does so and a requester only needs to support one choice so can select a stack that does not support some options if it is 'best suited' to supporting one of the remaining ones. This is included in the heuristic functions which will then differ for a provider or a requester stack selection.

Simple Heuristic Embodiment

An example container has two stacks Stack A and Stack B; however more than two stacks can be used. In this example case, it is assumed that stack A is high function but high performance cost and B is the opposite. The heuristic creator has to decide which policy assertions are important and which are not.

1. For each assertion A(x), a non-negative (0 . . . anything) value is given for each stack that supports that assertion. The 'better' that stack supports that assertion, the higher the value given. 'Better' in this case is a qualitative decision on the part of the heuristic designer.
If the stack does not support the assertion at all, it is given a negative value.
2. All assertions not evaluated above have a default value of 0.
3. The heuristic takes as input the normalized policy from the deployment agent.
4. For each option in the policy, it evaluates the assertions in that option.
a. If any assertion (A(x) as defined in stage 1) results in a negative value then that value is returned.
b. Otherwise, return a value obtained by summing the values for all the assertions (A(x)) in that option (as defined in stage 1).
5. The heuristic then selects the highest value obtained from evaluating each option and returns this as a result of the heuristic.

Since in this simple example Stack A is strictly worse in terms of performance when compared to Stack B, the heuristic designer can simply say for Stack A that A(x) returns 0 for each supported assertions and −1 if unsupported. For Stack B, A(x) could return 1 for each supported assertion and −1 for each unsupported assertion. This would mean that, if all the assertions for a given Web Service are supported in Stack B, it will choose that over Stack A.

More Complex Heuristic Embodiment

This example is also limited to two stacks, and it is assumed that this is for selection of a provider of the Web Services stack. (The heuristic would change if it was for the requester's stack selection). In this case, the set of assertions are expanded to include three specification defined assertions as described above. Two hypothetical assertions are created that can be derived from WSDL and another hypothetical assertion that can be derived from side information.

Specification Defined Assertions:
1.<wsrmp:RMAssertion/>
2.<wsat:ATAssertion/>
3.<wsoma:MTOM/>

Implied from WSDL Assertions:
4.<imp:SOAP11/> ←! Service must use SOAP 1.1
5.<imp:SOAP12/> ←! Service must use SOAP 1.2
Side Information Assertion:
6.<side:UsesDB/> ←! Service makes uses of a Data Base The heuristic designer has to analyze the relative behavior of the stacks in question with regard to support or preference for these capabilities.

To demonstrate a more complex heuristic some choices can be made depending on combinations of capabilities rather than being distinct.

Stack A:
  Does not support SOAP 1.2
  Very fast for SOAP 1.1
  Slow Database Access
  Fast at RM (Reliable Messaging)
  Fast at MTOM
  OK at WS-AT (Atomic Transactions)
  Very Poor performance when RM & MTOM are deployed together.
Stack B:
  Supports SOAP 1.1 & 1.2
  OK performance for both SOAP 1.1 & SOAP 1.2
  Fast Database Access
  Poor at RM (Reliable Messaging)
  Good at MTOM
  OK at WS-AT (Atomic Transactions)
  WS-AT & MTOM do not work together at all.

To create the heuristic, the numerical function that can evaluate a single set of policy assertions is needed.

The policy assertions above are numbered as 1 . . . 6 so A1 . . . A6 in the example algorithm below refers to those assertions. A(x) has a value of 1 if the assertion x (i.e. the assertion x place down the list) is present in the evaluated policy choice, and 0 if not.

A possible heuristic for the above stacks could be:

```
For Stack A:
If A(5) = 1 then value = −1    ! No support for SOAP 1.2
otherwise
value   =    A(1) * 50    ! fast for WS-RM
  +    A(2) * 25    ! Ok for WS-AT
  +    A(3) * 50    ! fast for MTOM
  +    A(4) * 100   ! Very Fast for SOAP 1.1
  +    A(6) * 1     ! Slow Database Access
If A(1) & A(3) then value =
value − 100              ! deal with the fact that RM & MTOM
together are not good.
For Stack B:
If A(4)=1 & A(3)=1 then value = −1 ! No support
for MTOM & WS-AT at the same time otherwise
value   =    A(1) * 1        ! poor for WS-RM
  +    A(2) * 25    ! Ok for WS-AT
  +    A(3) * 25    ! good for MTOM
  +    A(4) * 25    ! Ok for SOAP 1.1
  +    A(5) * 25    ! Ok for SOAP 1.1
  +    A(6) * 100   ! Fast Database Access
```

Example of evaluating a normalized policy against the two heuristics.

Example Policy

```
<wsp:Policy>
<wsp:ExactlyOne>
<wsp:All>
<wsrmp:RMAssertion/>
```

```
<wsat:ATAssertion/>
<imp:SOAP11/>
<side:UsesDB/>
</wsp:All>
<wsp:All>
<wsrmp:RMAssertion/>
<wsat:ATAssertion/>
<imp:SOAP12/>
<side:UsesDB/>
</wsp:All>
</wsp:ExactlyOne>
</wsp:Policy>
```

This policy describes a service that must use WS-RM and WS-AT, could use either SOAP 1.1 or 1.2 and makes use of a data base.

So as described in the simple heuristic, the function defined above is used to evaluate each individual set of policy assertions and give a final value of the lowest value for each set. If the stack selection is for the requester, a single stack can be selected and the highest value can be selected.

For stack A and choice one (<wsrmp:RMAssertion/><wsat:ATAssertion/><imp:SOAP11/><side:UsesDB/>), the result is:
A(1)=1, A(2)=1, A(3)=0, A(4)=1, A(5)=0, A(6)=1
running the function for stack A, gets 1*50+1*25+0*50+1*100+1*1=76.

For stack A and choice two (<wsrmp:RMAssertion/><wsat:ATAssertion/><imp:SOAP12/><side:UsesDB/>), running the function stack A, gets a value of −1 (as A(5) is true).

This gives us a final value of −1 for stack A, as that was the lowest value for the two choices.

Doing the same for stack B's heuristic gives us 151 for choice one and the same for choice two. So the final value if 151.

This would mean that the deployment agent would choose to deploy the service on stack B.

If the second choice is removed from the policy (i.e. saying that the service does not need to support SOAP 1.2), then the comparison would now favor stack A (176>151).

WORKED EXAMPLE

A working example is given for a CICS Transaction Server (CICS is a trade mark of International Business Machines Corporation).

CICS TS intends to support an Apache Axis2 based Web Services stack alongside its existing native Web Services stack. At deployment time CICS will interrogate the WS-Policy information to build a list of the required capabilities for the Web Service.

For example:
Web Service A uses WS-AT, WS-Security (UserNameToken, no encryption, no signature) and MTOM/XOP;
Web Service B uses WS-Addressing and WS-Security(Encryption);
Web Service C uses no WS-* capabilities.

A heuristic function is called for each stack which assigns a weighted value for each capability and produces a final suitability value for that stack. For example, the most obvious weighting is a large negative value if the stack does not support the capability.

Using the above example it can be know that using WS-Security(encryption) performs much better in the Axis2 stack than the native stack and thus weight the choice heavily in that direction for Web Service B, but that if all other things are equal (as in Web Service C) the native stack heuristic should return a higher value, as the performance is better.

The runtime then dynamically creates a runtime configuration for the stack that is selected by the system on the basis of the heuristic and associates it with that Web Service.

One advantage over the manual choice approach is that the extensive knowledge as to the relative stack capabilities and QoS can be encapsulated in the choice function (which uses Policy and WSDL as an input) and frees the deployer from the burden of understanding these details and having to make the choice. This approach can be used alongside a manual choice approach.

The described deployment agent may be provided to a client as a service over a network.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, or transport the program for use by or in connection with the instruction execution system, apparatus or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer-based method for selection of a runtime stack for deployment of a Web Service, comprising:
generating, at a computer server, policy assertions for a Web Service to be deployed;
providing, at a computer server, a scoring mechanism dynamically unique for each available runtime stack in which the ability of a stack to support each of a plurality of policy assertions is scored with a numerical value;
applying, at a computer server, the scoring mechanism dynamically unique for each available runtime stack to the policy assertions for the Web Service to be deployed; and
selecting, at a computer server, a stack based on the results of applying the dynamically unique scoring mechanism for each available runtime stack.

2. The method of claim 1, wherein generating policy assertions for a Web Service to be deployed comprises using specification defined Web Service policy assertions.

3. The method of claim 1, wherein generating policy assertions for a Web Service to be deployed comprises:
scanning a service description in WSDL (Web Services Description Language) for WSDL elements a the Web Service and mapping the WSDL elements to policy assertions.

4. The method of claim 1, wherein generating policy assertions for a Web Service to be deployed comprises:
converting side information requirements of the Web Service and mapping the requirements to policy assertions.

5. The method of claim 4, wherein the side information is provided by a provider or a requester of the Web Service to be deployed and the side information relates to service requirements of the provider or requester.

6. The method of claim 1, wherein generating policy assertions for a Web Service to be deployed comprises normalizing a policy to include one or more alternative sets of policy assertions, and wherein the scoring mechanism is applied to each set of policy assertions.

7. The method of claim 6, wherein the selection of runtime stack is for a Web Service provider, and the results of the scoring mechanism are used to select a stack which supports all the sets of policy assertions.

8. The method of claim 6, wherein the selection of runtime stack is for a Web Service requester, and the results of the scoring mechanism are used to select a stack which best supports one of the alternative sets of policy assertions.

9. The method of claim 1, wherein the scoring mechanism gives a positive value if a policy assertion is supported and a negative value if a policy assertion is not supported by a stack.

10. The method of claim 9, wherein the values are combined for a set of policy assertions required for a Web Service.

11. The method of claim 1, wherein a runtime stack handles the Web Services protocol and transport processing required for a request or response.

12. A computer program product stored on a computer readable storage device for selection of a runtime stack for deployment of a Web Service, comprising computer readable program code for performing the steps of:
generating policy assertions for a Web Service to be deployed;
providing a scoring mechanism dynamically unique for each available runtime stack in which the ability of a stack to support each of a plurality of policy assertions is scored with a numerical value;
applying the scoring mechanism dynamically unique for each available runtime stack to the policy assertions for the Web Service to be deployed; and
selecting a stack based on the results of applying the scoring mechanism dynamically unique for each available runtime stack.

13. A method of providing a service to a customer over a network, the service comprising:
generating, at a computer server, policy assertions for a Web Service to be deployed;
providing, at a computer server, a scoring mechanism dynamically unique for each available runtime stack in which the ability of a stack to support each of a plurality of policy assertions is scored with a numerical value;
applying, at a computer server, the scoring mechanism dynamically unique for each available runtime stack to the policy assertions for the Web Service to be deployed; and
selecting, at a computer server, a stack based on the results of applying the scoring mechanism dynamically unique for each available runtime stack.

14. A system for selection of a runtime stack for deployment of a Web Service, comprising:
a runtime container comprising a processor and a plurality of stacks to which a Web Service could be deployed;
a generator that generates policy assertions for a Web Service to be deployed;
a scoring mechanism applied to the policy assertions for the Web Service to be deployed that is dynamically unique for each available runtime stack in which the ability of a stack to support each of a plurality of policy assertions is scored with a numerical value; and
a selector for selecting a stack based on the results of applying the scoring mechanism dynamically unique for each available runtime stack.

15. The system of claim 14, wherein the generator lists specification defined Web Service policy assertions.

16. The system of claim 14, wherein the generator comprising:
a mechanism for scanning a service description in WSDL for WSDL elements of the Web Service and rules mapping the WSDL elements to policy assertions.

17. The system of claim 14, wherein the generator comprises:
a converter for converting side information requirements of the Web Service and rules mapping the requirements to policy assertions.

18. The system of claim 14, wherein the generator comprises a normalizer for normalizing a policy to include one or more alternative sets of policy assertions and wherein the scoring mechanism is applied to each set of policy assertions.

19. The system of claim 18, wherein the runtime container is a provider of a Web Service and the results of the scoring mechanism are used to select a stack which supports all the sets of policy assertions.

20. The system of claim 18, wherein the runtime container is a requester of a Web Service and the results of the scoring mechanism are used to select a stack which best supports one of the alternative sets of policy assertions.

21. The method of claim 13, wherein a runtime stack handles the Web Services protocol and transport processing required for a request or response.

* * * * *